No. 846,524. PATENTED MAR. 12, 1907.
W. P. & S. G. THOMSON.
RAIL JOINT.
APPLICATION FILED AUG. 30, 1906.

3 SHEETS—SHEET 1.

WITNESSES
W. W. Swartz
H. M. Corbin

INVENTORS
W. P. Thomson
S. G. Thomson
by Bakewell & Byrnes
Attys.

No. 846,524. PATENTED MAR. 12, 1907.
W. P. & S. G. THOMSON.
RAIL JOINT.
APPLICATION FILED AUG. 30, 1906.

3 SHEETS—SHEET 2.

WITNESSES
W. W. Swartz
A. M. Conlin

INVENTORS
W. P. Thomson
S. G. Thomson,
by Bakewell & Byrnes
Attys

No. 846,524. PATENTED MAR. 12, 1907.
W. P. & S. G. THOMSON.
RAIL JOINT.
APPLICATION FILED AUG. 30, 1906.

3 SHEETS—SHEET 3.

WITNESSES
W.W. Swartz
H. M. Corwin

INVENTORS
W. P. Thomson
S. G. Thomson,
By Bakewell & Byrnes,
Attys.

UNITED STATES PATENT OFFICE.

WILLIAM P. THOMSON, OF LANSDOWNE, AND SAMUEL G. THOMSON, OF ALTOONA, PENNSYLVANIA, ASSIGNORS TO THOMSON-THOMSON COMPANY, OF PHILADELPHIA, PENNSYLVANIA, A PARTNERSHIP.

RAIL-JOINT.

No. 846,524.   Specification of Letters Patent.   Patented March 12, 1907.

Application filed August 30, 1906. Serial No. 332,573.

*To all whom it may concern:*

Be it known that we, WILLIAM P. THOMSON, of Lansdowne, Delaware county, and SAMUEL G. THOMSON, of Altoona, Blair county, Pennsylvania, have invented a new and useful Rail-Joint, of which the following is a full, clear, and exact description, reference being had to the accompanying drawings, forming part of this specification, in which—

Figures 1 to 18, inclusive, are end views, with one of the rails removed, showing different forms of our improved joint.

Our invention has relation to that type of rail-joints wherein the splice-bars are provided with freely-depending flanges which extend below the rail-base, the object of our invention being to materially lighten the middle member or portion of the freely-depending flange, and thus cheapen the construction of the splice-bar, while at the same time providing increased resiliency. It has been demonstrated by practice that under certain traffic conditions it is desirable to provide a joint having a preponderance of resiliency, and these conditions are designed to be met by our present invention.

With this object in view our invention consists in a splice-bar having a freely-depending flange to extend below the base of the rail, said flange being of gradually-diminishing thickness toward its lower end. This flange may be of various specific forms, its essential characteristic in every case being the gradual diminution in thickness toward its lower free edge. The lower edge of the flange may be stiffened by a bead or rib, formed either at its inner or outer surface or at both sides.

Figure 1:
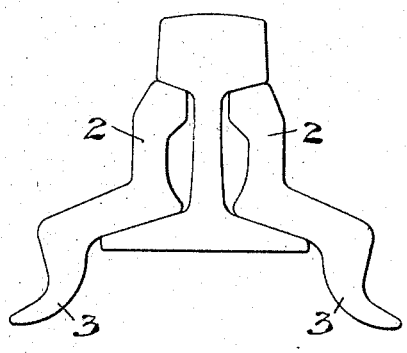
Figure 2:
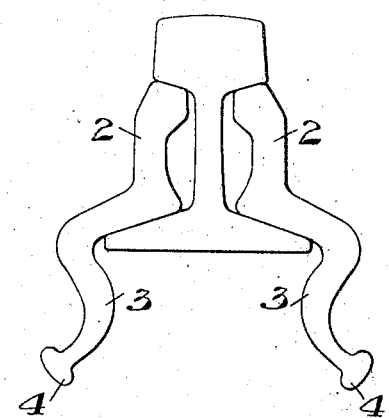
Figure 3:
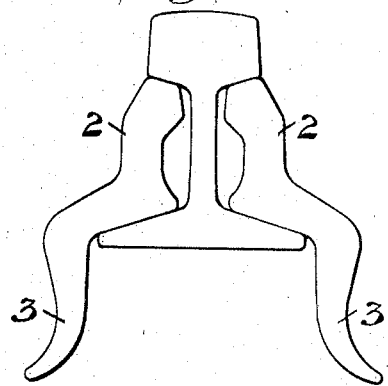
Figure 4:
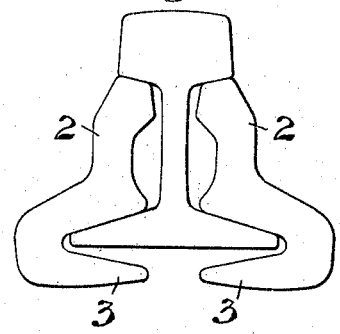
Figure 5:
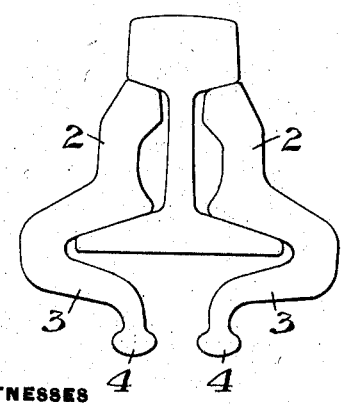
Figure 6:
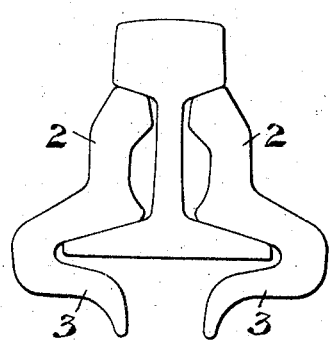
Figure 7:
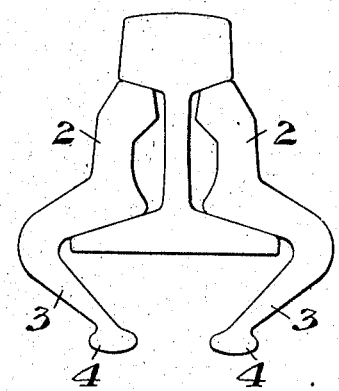
Figure 8:
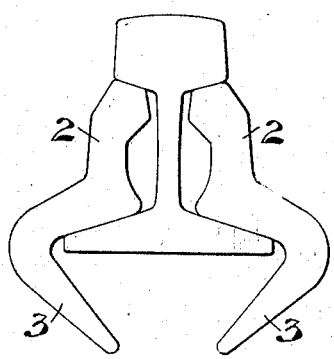
Figure 9:
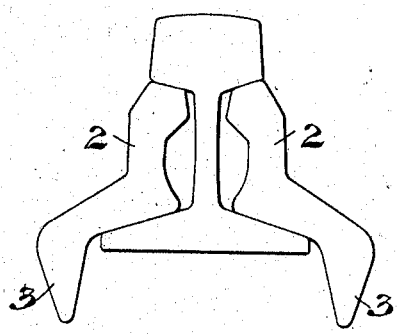
Figure 10:
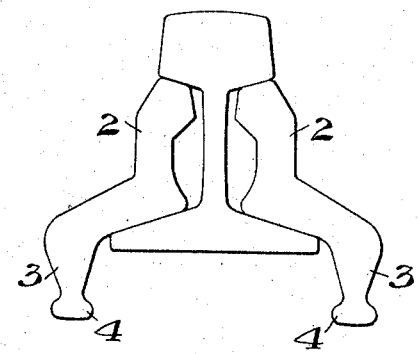
Figure 11:
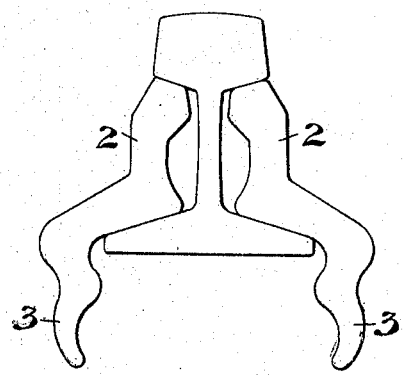
Figure 12:
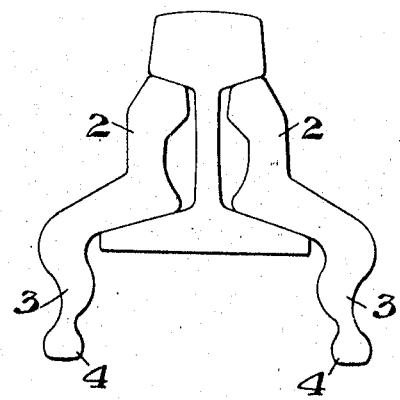
Figure 13:
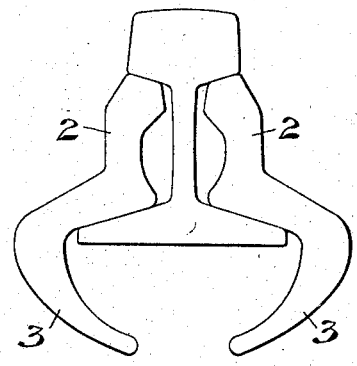
Figure 14:
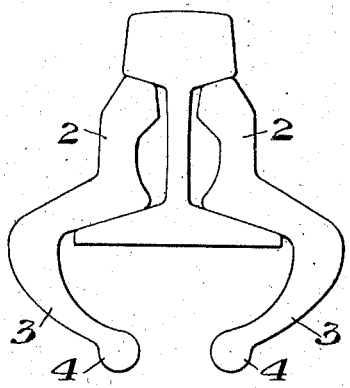
Figure 15:
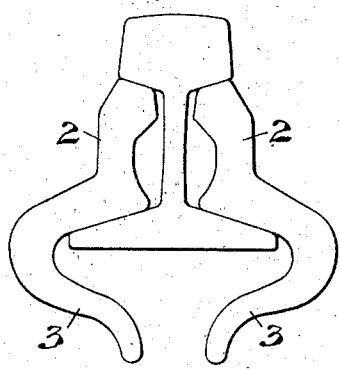
Figure 16:
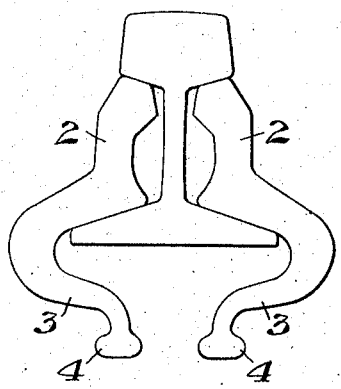
Figure 17:
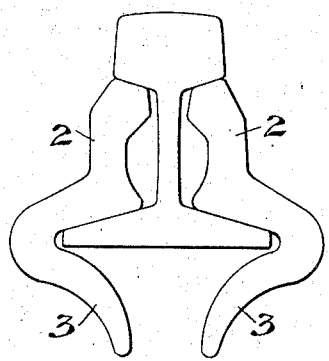
Figure 18:
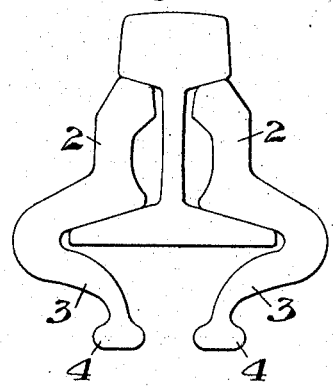

In the drawings the numeral 2 designates the splice-bar proper, which may be of the usual form, and 3 the freely-depending flange. The freely-depending flange is gradually reduced in thickness from its upper to its lower edge. These flanges may be bent outwardly or away from each other, as shown in Figs. 1, 2, and 3. They may be bent inwardly and downwardly, as shown in Figs. 5, 6, 7, 8, 13, 14, 15, 16, 17, and 18. They may extend in substantially parallel vertical planes, as shown in Figs. 9, 10, 11, and 12, or they may be bent horizontally inward underneath the base of the rail, as shown in Fig. 4. They may be of curvilinear form with either simple or compound curves, as shown in Figs. 1, 2, 3, 5, 6, 11, 12, 13, 14, 15, 16, 17, and 18, or they may be formed with a straight gradual taper, as in Figs. 4, 7, 8, 9, and 10. Any of the various forms illustrated may or may not be provided with a stiffening bead or rib at its lower edge, several forms of such beads being shown at 4 in Figs. 2, 5, 7, 10, 12, 14, 16, and 18.

The precise form of the flanges in the several modifications illustrated will be best understood by reference to the drawings, and it will be obvious that various other modifications embodying the spirit of our invention may be made.

The advantages of our invention consist in the provision of a splice-bar having a freely-depending flange whose middle portion or member is materially lightened, and which possesses a maximum of resiliency.

What we claim is—

1. A splice-bar for rails having a freely-depending flange to extend below the base of the rail, said flange gradually decreasing in thickness toward its lower edge; substantially as described.

2. A splice-bar for rails having a freely-depending flange to extend below the base of the rail, said flange gradually decreasing in thickness through its intermediate middle portion toward its lower edge; substantially as described.

3. A splice-bar for rails having a freely-depending flange to extend below the base of the rail, said flange being of gradually-decreasing thickness toward its lower end, and stiffened at its lower edge; substantially as described.

4. A splice-bar for rails having a freely-depending flange to extend below the base of the rail, said flange being of gradually-decreasing thickness through its middle portion and stiffened at its lower edge at the inner side; substantially as described.

5. A splice-bar for rails having a freely-depending flange to extend below the base of the rail, said flange being of gradually-decreasing thickness through its middle portion and stiffened at its lower edge at the outer side; substantially as described.

6. A splice-bar for rails having a freely-depending flange to extend below the base of the rail, said flange being of gradually-decreasing thickness toward its lower edge and stiffened at its lower edge at both inner and outer sides; substantially as described.

7. A splice-bar for rails having a freely-depending flange to extend below the base of the rail, said flange being of gradually-decreasing thickness toward its lower edge and having a curvilinear face; substantially as described.

8. A splice-bar for rails having a freely-depending flange to extend below the base of the rail, said flange being of gradually-decreasing thickness toward its lower edge and having a compound curve; substantially as described.

9. A splice-bar for rails having a freely-depending flange to extend below the base of the rail, said flange being of gradually-decreasing thickness toward its lower edge and having a curvilinear face stiffened at or near its lower edge; substantially as described.

10. A splice-bar for rails having a freely-depending flange to extend below the base of the rail, said flange being of gradually-decreasing thickness through its middle portion and stiffened at its lower edge uniformly upon both sides of its central plane; substantially as described.

11. A splice-bar for rails having a freely-depending flange to extend below the base of the rail, said flange having a reversely-curved middle portion or member which is of gradually-decreasing thickness toward the lower edge of the flange; substantially as described.

12. A splice-bar for rails having a freely-depending flange to extend below the base of the rail, said flange having a reversely-curved middle portion or member which is of gradually-decreasing thickness toward the lower edge of the flange, said flange being stiffened at its lower portion; substantially as described.

In testimony whereof we have hereunto set our hands.

WILLIAM P. THOMSON.
SAMUEL G. THOMSON.

Witnesses as to W. P. Thomson:
EDWARD H. CLOUD,
FERGUS F. MACWILKIE.

Witnesses as to S. G. Thomson:
McLEOD THOMSON,
CHAS. H. MORGAN.